United States Patent [19]

Cotta Ramusino

[11] Patent Number: 4,602,901
[45] Date of Patent: Jul. 29, 1986

[54] MILLING-BORING MACHINE

[75] Inventor: Francesco Cotta Ramusino, Brescia, Italy

[73] Assignee: Innse Innocenti Santeustacchio S.p.A., Brescia, Italy

[21] Appl. No.: 577,395

[22] Filed: Feb. 6, 1984

[30] Foreign Application Priority Data

Feb. 11, 1983 [IT] Italy ............................... 19553 A/83

[51] Int. Cl.$^4$ ............................................... B23C 1/04
[52] U.S. Cl. ..................................... 409/203; 29/568; 409/213
[58] Field of Search ............... 29/568, 26 A; 409/213, 409/215–217, 230, 231, 233, 203

[56] References Cited

U.S. PATENT DOCUMENTS

| | | | |
|---|---|---|---|
| 997,024 | 7/1911 | Vernet ................................. | 409/215 |
| 3,359,861 | 12/1967 | Johnson et al. ................. | 409/216 X |
| 3,846,904 | 11/1974 | Kuhnert ............................. | 29/568 |
| 4,141,133 | 2/1979 | Grinage ............................. | 29/568 |

Primary Examiner—Eugene F. Desmond
Attorney, Agent, or Firm—Robbins & Laramie

[57] ABSTRACT

A milling-boring machine is described which allows various types of operations to be carried out on a workpiece of medium-large size so as to allow its complete working in a single location. The machine includes a pillar, a slide movable vertically along the pillar and a cylindrical head rotatably mounted in the slide, the head being rotatable and the slide being movable by digitally controlled drive means. The head carries two mandrels with their axes parallel to each other and parallel to the axis of the head, and at a predetermined distance therefrom, the mandrels being selectively rotatable at different speeds. Selected tools are mounted on the mandrels and on tool accessories attachable to the head. The machine further includes an accessory magazine for selectively supplying accessories to the head and a tool magazine for selectively supplying tools to the mandrels and to the tool accessories, with automatic devices for changing the accessories and the tools.

2 Claims, 9 Drawing Figures

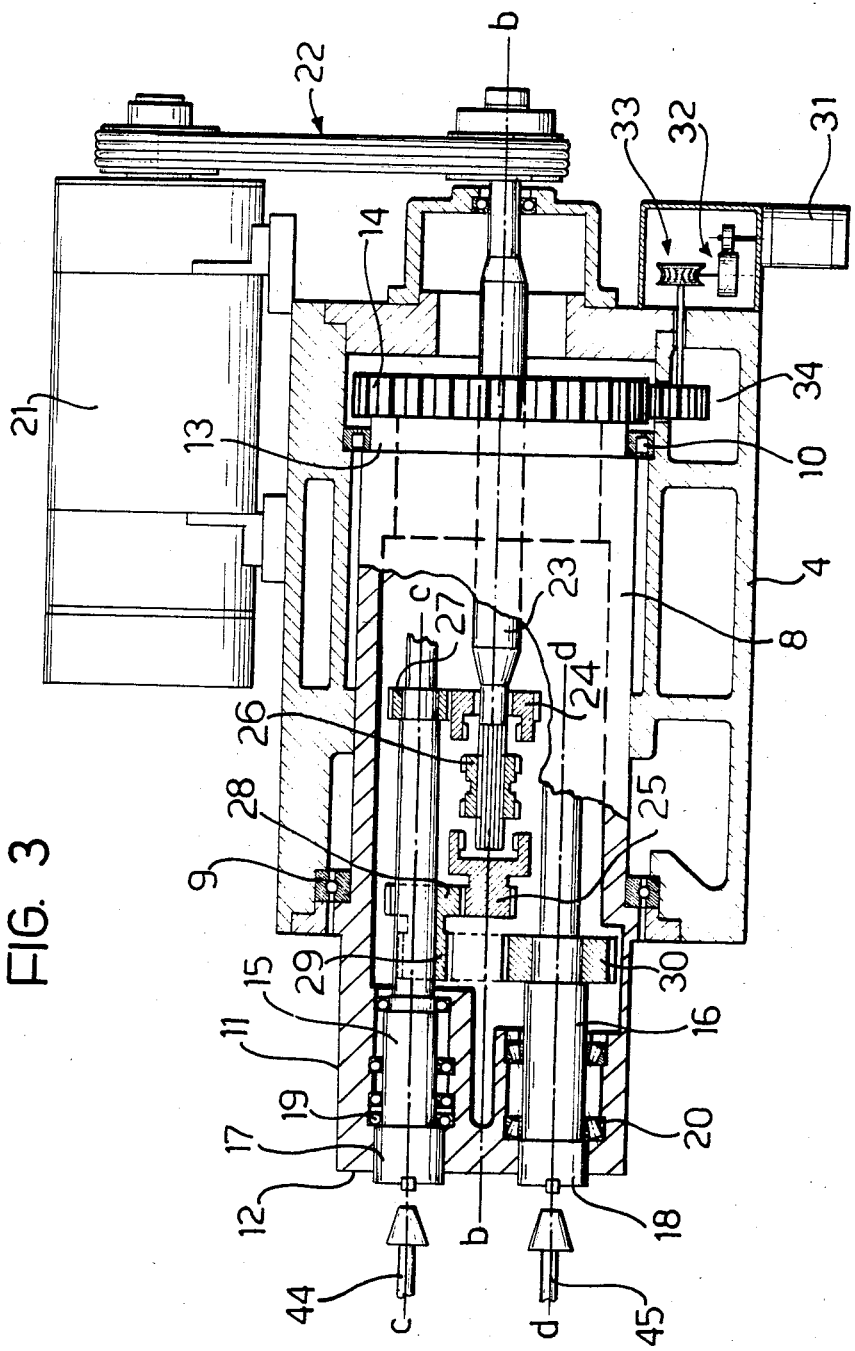

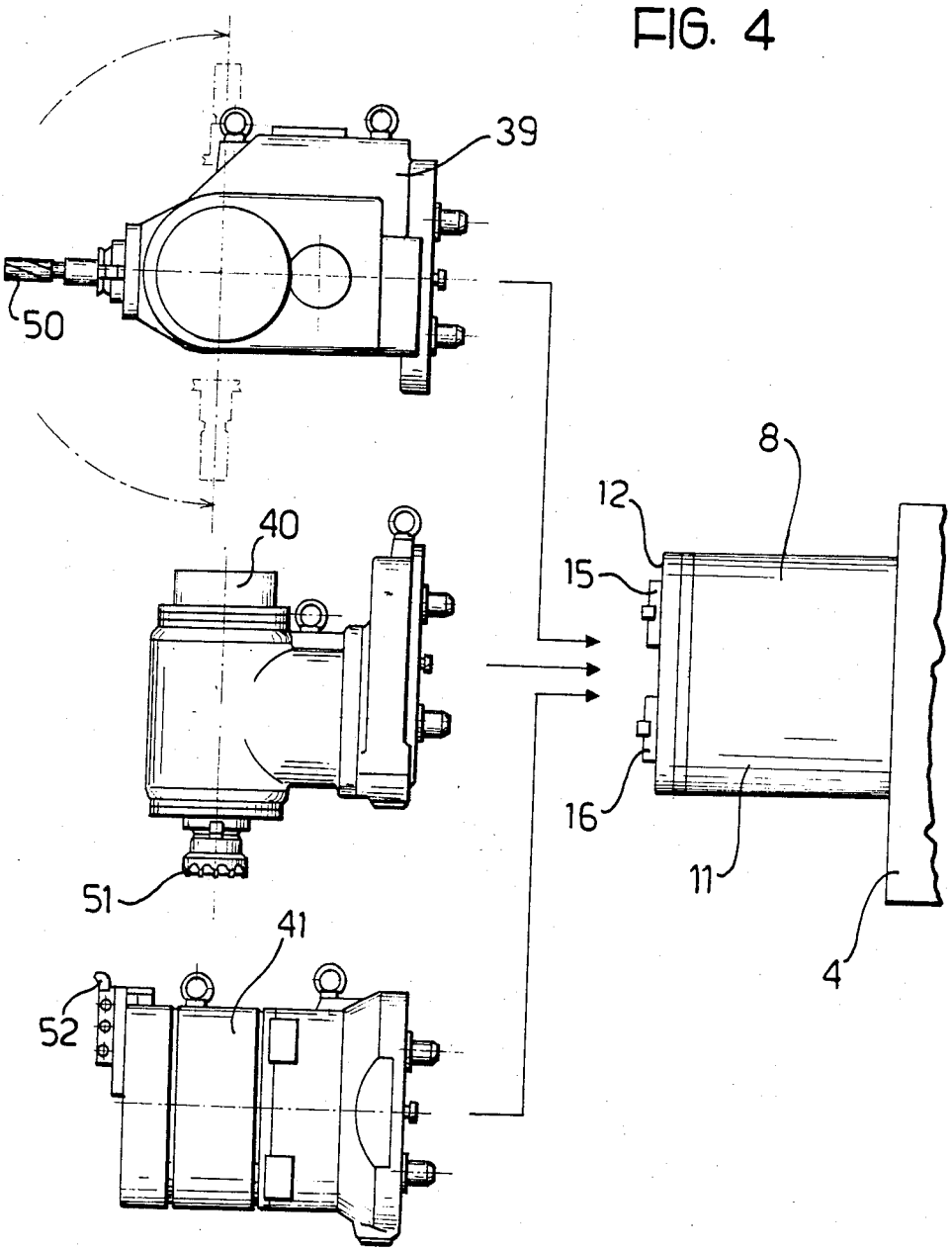

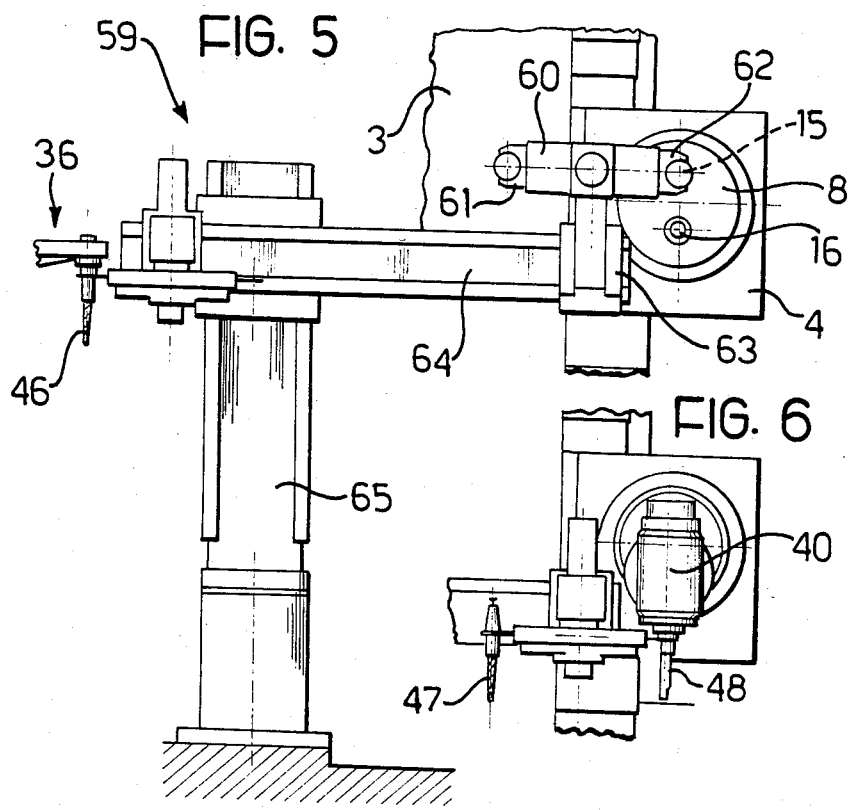
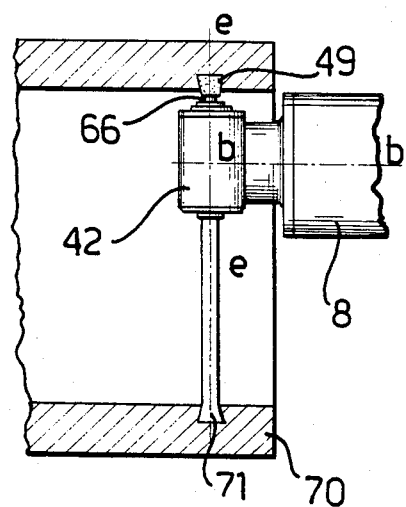
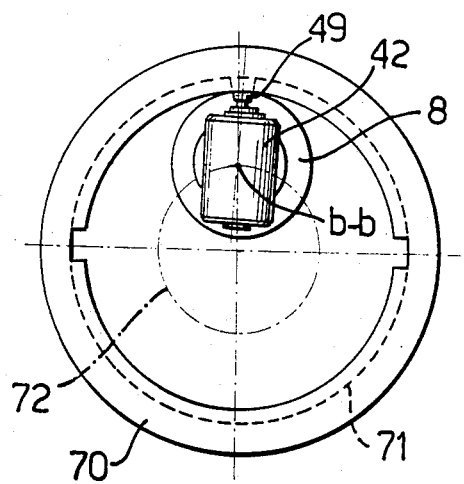

MILLING-BORING MACHINE

DESCRIPTION

The present invention relates to a milling-boring machine of the type including a slide movable vertically along a pillar and provided with a selected tool or an accessory provided with a tool, for the working of a workpiece, particularly of medium-large size, in which the piece and the tool are movable relative to each other in two horizontal directions.

The machines to which the present invention relates are widely used for working pieces of medium-large size, for example reduction gear casings, valve bodies, bodies of compressors or small turbines, diesel engine blocks, tank bodies, etc.

Such pieces require a large number of operations in order to complete their working. Among these, only some can at present be carried out on milling-boring machines of known type. Other operations cannot be carried out on such machines and require the piece to be transferred to other machine tools with obvious increases in the working cycle and additional times for a series of transfers and enplacements, which are evidently costly and practically impossible to automate because of the size of the pieces and the fact that these are operations on small production runs, often a single piece.

A principal operation carried out by known milling-boring machines is the milling of flats, typically large joining planes for pieces formed in two halves, with a large capacity and productivity without dimensional limits, obviously within the range of movement allowed by the permitted travel of the machine.

The known machines lend themselves equally well to the carrying out of various boring type operations, typically the working of bearing seats in the various outer and inner walls of workpieces.

However, several limitations are already found in this type of working, for example in the diameter of the seats to be worked and the productivity. When these diameters exceed certain dimensions, as in the case of large diameter holes for receiving turbine or rotor casings, these are, to advantage, carried out in boring mills or, if current milling-boring machines are used, recourse is made to a rotatable work-piece-carrying table with a horizontal axis of rotation whereby the working possibilities of the available boring-milling machines are extended.

There are obvious disadvantages in both cases. In particular rotatable workpiece-carrying tables, as well as constituting a considerable added expense, result in a reduction in the precision of the machine overall, even for those operations such as milling flats for which they are typically adapted.

The problem at the root of the present invention is that of devising a machine of the type specified with structural and functional characteristics such as to allow the working of pieces with medium-large dimensions while overcoming the disadvantages mentioned above with reference to the known art.

This problem is solved by a milling-boring machine of the type specified which is characterised in that it includes a cylindrical head having its axis parallel to one of the said horizontal directions, mounted on the slide so as to be rotatable about the said axis and provided with a surface for fixing the accessory provided with the tool, at least one mandrel rotatably mounted in the head with its axis parallel to the axis of the head and in mutually spaced relationship therewith and having an attachment for the tool, as well as numerically controlled drive means for effecting the vertical movement, the horizontal movement in one of the said directions and the rotation of the head.

To advantage there are two mandrels with respective axes parallel to each other and equidistant from the axis of the head.

Further characteristics and advantages of the milling-boring machine according to the present invention will become apparent from the description below of a preferred embodiment, given by way of non-limiting example with reference to the appended drawings, in which.

Figure 1:
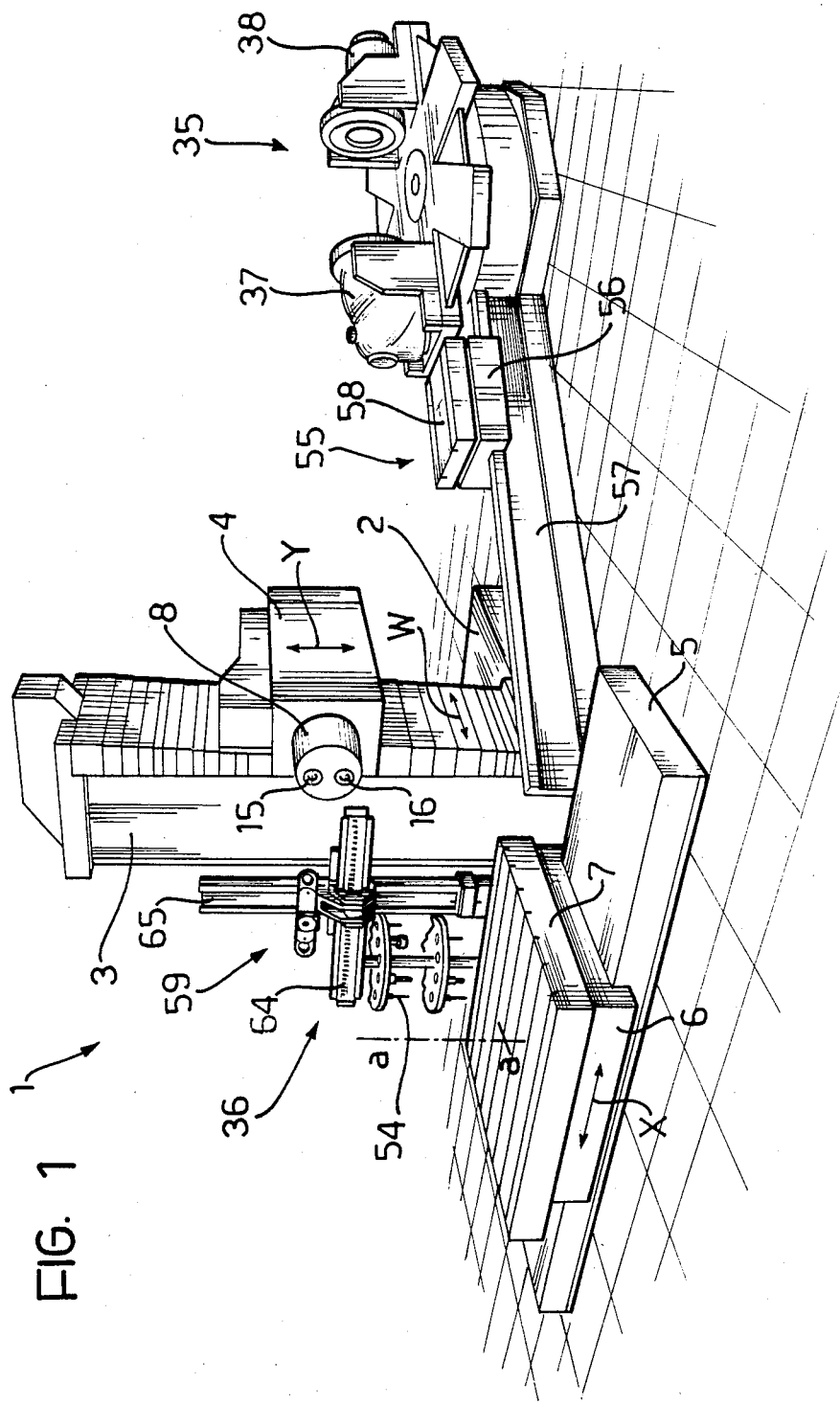
FIG. 1 is a schematic perspective view of a machine according to the invention.
Figure 2:
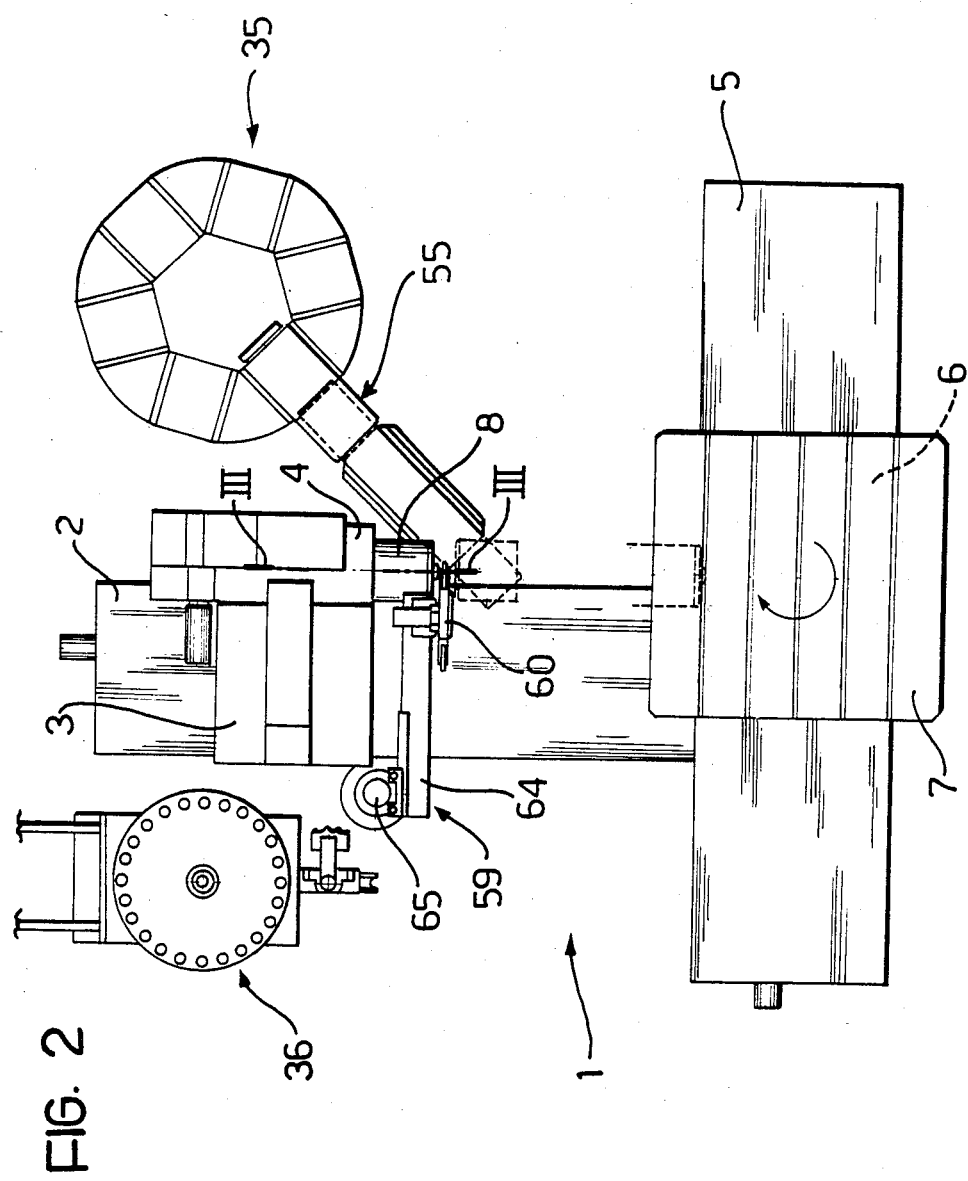
FIG. 2 is a plan view of the machine of FIG. 1.
Figure 9:
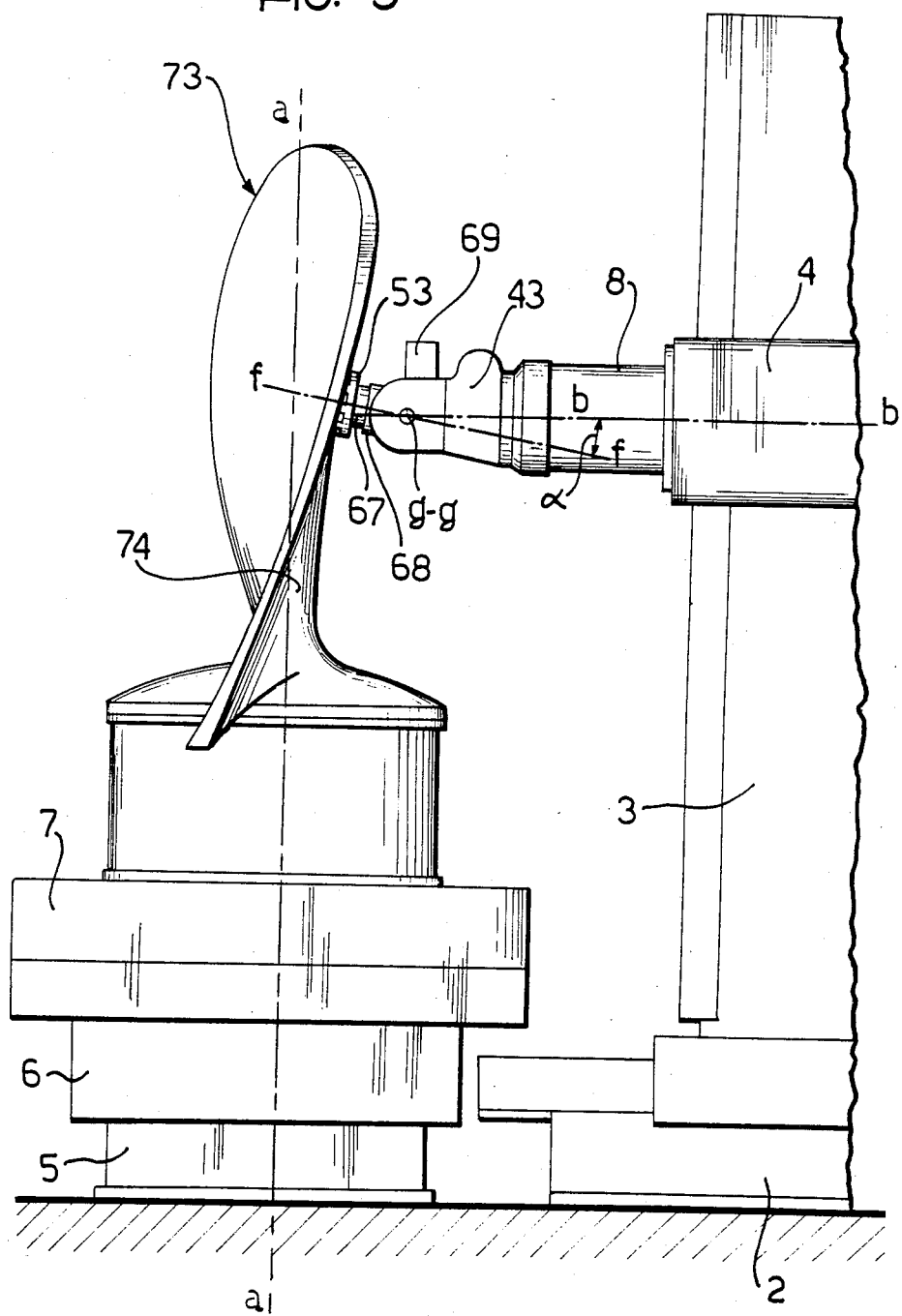

FIG. 3 is a sectional view of a detail of the machine of FIG. 1, taken on the line III—III in FIG. 2, FIG. 4 is a view of a detail of the machine of FIG. 1 with examples of accessories which can be attached thereto, FIG. 5, is a view of a detail of the machine of FIG. 1 with a tool-changing device operative on a mandrel, FIG. 6 is a view of a detail of the machine of FIG. 1 with a tool changing device operative on an accessory, FIGS. 7 and 8 are a front view and a side view respectively of an accessory during working, and FIG. 9 is a side view of another accessory during working.

With reference to the appended drawings, a milling-boring machine according to the invention is generally indicated 1.

The machine 1 includes an elongate base 2 along which a pillar 3 is slidable in a horizontal direction W.

A slide 4 is slidable vertically along the pillar 3, the vertical direction being indicated by Y in the drawings.

As will be described in greater detail below, the slide 4 is intended to be coupled to a tool or an accessory provided with a tool.

The machine 1 includes a further base 5 which is elongate in a horizontal direction X perpendicular to the direction W. A carriage 6 is slidable along the base 5 in the direction X and mounted thereon is a platform 7 rotatable about an axis a—a parallel to the direction Y and intended to receive a workpiece of medium-large dimensions to be worked.

On the slide 4 is mounted a substantially cylindrical shaped head 8 with an axis b—b. More particularly, the head 8 is mounted on the slide 4 with the axis b—b parallel to the direction W and so as to be rotatable about this axis. For this purpose rolling bearings 9 and 10 are provided between the slide 4 and the head 8.

The head 8 has an end portion 11 projecting from the slide 4 towards the piece-carrying platform 7. The portion 11 terminates at a surface 12 for the fixing of an accessory.

The opposite end 13 of the cylindrical head 8 is coaxially keyed to a ring gear 14.

Two mandrels are rotatably mounted on the head 8, in particular a first (fast) mandrel 15 with axis c—c and a second (slow) mandrel 16 with axis d—d; these mandrels have respective attachments 17 and 18, which are similar to each other, for the fixing of respective tools. The axes c—c and d—d are parallel to the axis b—b of the head 8 and coplanar therewith and in mutually spaced relationship therewith, preferably equidistant therefrom.

The fast mandrel 15 is supported in the head 8 by oblique contact ball bearings 19 while the slow mandrel 16 is supported by taper roller bearings 20. A motor 21 fixed to the slide 4 rotates one or other mandrel selectively, the motor 21 driving, through a belt transmission 22, a shaft 23 rotatably supported in the head 8 with its axis coincident with the axis b—b. The shaft 23 rotates a gear 24 or a gear 25, coaxial therewith, according to whether a clutch 26 engages one or the other of these.

The gears 24 and 25 driven selectively by the shaft 23 respectively rotate the mandrel 15 through a gear 27 keyed onto the mandrel 15 itself and the mandrel 16 through a gear chain 28, 29 and 30, the final gear 30 of which is keyed to the mandrel 16 itself.

The gears 25 and 27 and the gears 24, 28, 29 and 30 constitute respective gear trains having different transmission ratios, to advantage, an amplification ratio and a reduction ratio respectively in accordance with the desired speeds for the fast mandrel 15 and the slow mandrel 16.

The machine 1 also includes numerically controlled drives means of conventional type for the coordinated control of the movements of the pillar 3, the slide 4 and the carriage 6 along the respective directions W, Y and X, as well as of the rotation of the platform 7 about the axis a—a and the rotation of the cylindrical head 8 about the axis b—b.

More particularly, the drive means for rotating the cylindrical head 8 comprise a d.c. motor 31 which drives a pinion 34 meshed with the crown wheel 14 through pair of cylindrical gear 32 and a worm and worm wheel 33.

The numerically controlled drive means ensure that the piece and the tool move relative to each other in accordance with a desired path, as will be explained below.

The machine 1 includes, on opposite sides of the pillar 3, an accessory magazine generally indicated 35 and a tool magazine indicated 36.

In the drawings various accessories are indicated 37,38,39,40,41,42 and 43 which are intended to be fixed to the surface 12 of the cylindrical head 8 while references 44 to 54 indicate various tools provided for the working of the piece intended to be fixed directly to one of the attachments 17 or 18 of the mandrels 15 or 16 or to one of the accessories 37–43.

The drive for the accessories for rotating the tool fixed thereto is derived from the fast mandrel 15 or the slow mandrel 16 according to the desired speed for the tool.

To advantage the machine 1 also includes an accessory changing device 55 which extends operatively between a predetermined position occupied by the cylindrical head 8 during changing of the accessory and the accessory magazine 35. This device, in the example illustrated, comprises a carriage 56 slidable along a rail 57 and provided with a table 58 rotatable through 45° and on which an accessory 37–43 is located selectively. The carriage 56 shuttles between the head 8 and the accessory magazine 35 carrying the accessories 37–43 which are to be used from time to time.

To advantage the machine 1 also includes a tool changing device 59 extending operatively between and cooperating with the cylindrical head 8 and the tool magazine 36. This device 59 includes a pivoted arm 60 having grippers 61 and 62 at its ends for taking up respective tools and is mounted on a carriage 63 so as to be pivotable about a horizontal axis, the carriage 63 being movable horizontally along a beam 64 which is in its turn guided for vertical movement on a column 65. The carriage 63 is movable between the head 8, in particular between one of the two mandrels 15 and 16 selectively, or one of the accessories 37–43 fixed to the head, and the tool magazine 36.

It should be noted that the accessory magazine 35 and the tool magazine 36, and aslo the accessory changing device 55 and the tool changing device 59, are controlled automatically in a suitable sequence with the working cycle of the machine which it is made to fulfill by the programming of the numerically controlled drive means.

Among the various accessories 37–43 illustrated, the accessory 42 should be noted (see FIGS. 7 and 8), which is a square head with a mandrel 66 having an axis e—e at a fixed angle of 90° to the axis b—b and dimensioned so as to carry a tool 49 of the inverted conical router type, for milling dovetail grooves.

Among the various accessories 37–43 illustrated the accessory 43 should also be noted (see FIG. 9) which is an angled head with a variable angle. More particularly, the accessory 43 has a mandrel 67 with an axis f—f at an angle α to the axis b—b of the rotatable head 8.

The mandrel 67 is rotatably supported in a support 68 which is pivoted to the accessory 43 about a pivot axis g—g passing through the intersection of axes f—f and b—b. Numerically controlled drive means 69 are provided for effecting the angular displacement of the support 68 relative to the accessory 43 in accordance with the desired value of the angle α from time to time.

The operation of the machine 1 according to the invention is described below with reference to a machining operation in which an annular internal groove of predetermined high diameter, for example a dovetail groove 71, is to be formed in a workpiece 70. For this purpose, the piece 70 is fixed on the platform 7 so that the axis of the groove to be formed is parallel to the axis b—b and the accessory 42 fixed to the rotatable head 8. The slide 4 and the carriage 6 are driven to effect numerically controlled coordinated displacement in the directions Y and X respectively so that the axis b—b of the head 8 describes a circular path of predetermined diameter indicated 72 in FIG. 8. Simultaneously the rotatable head 8 is made to rotate under digital control about its axis b—b, its rotation being coordinated with the movements in the directions Y and X, so that the axis e—e of the mandrel 64 is held constantly perpendicular to the circular path 72.

Thus the tool 49 describes a circular path in the piece 70, making the desired groove 71.

A further example of working is described below with reference to FIG. 9 in which reference 73 indicates a workpiece constituted by a Kaplan turbine blade which has a three-dimensional surface 74 to be worked.

For this purpose, the blade 73 is fixed to the platform 7 so that its axis coincides with the axis a—a and the accessory 43 is fixed to the rotatable head 8. The pillar 3, the slide 4 and the carriage 6 are made to effect numerically controlled coordinated movements in the directions W, Y and X respectively so that the milling tool 53 and the blade 73 mutually engage in correspondence with the surface 74 to be worked. Simultaneously the rotatable head 8 and the support 68 are made to rotate under numerical control coordinated with the movements in the directions W, Y and X so that the axis f—f of the mandrel 67, and hence of the milling tool 53, is maintained constantly perpendicular to the surface 74 to be worked. If the blade 73 has relatively high degrees of curvature on its surface 74 such as to exceed the range of variation of the angle α the blade 73 is to advantage made to rotate about its own axis by rotating the platform 7 under numerical control about its axis a—a.

The surface 74 of the blade 73 may thus be worked over its entire extent.

From the above it will be seen that the machine according to the invention has made it possible to work medium-large pieces with a single placement of the piece itself even when large holes are to be worked and to effect all similar operations such as the execution of large internal and external annular grooves of various cross sections, of flats on opposite faces of annular external flanges, and so on.

In order to do this, the workpiece and the tool are displaced relative to each other in a circular path according to the diameter of the working to be effected, by virtue of the combination of the movements in the directions Y and X, while the axis of the tool, rotatably supported by a suitable accessory mounted on the cylindrical head 8, is gradually oriented by virtue of the rotation of the cylindrical head about its axis so as to keep it always directed radially relative to the circular path.

The machine according to the invention has also made it possible to work pieces having surfaces of whatever shape, for example turbine blades for the hydroelectric industry and the like.

In this case, the piece and the tool are displaced relative to each other by virtue of the combination of movements along the directions Y, X and Z, in accordance with the particular conformation of the surface to be obtained on the piece, while the axis of the tool is maintained perpendicular to the surface to be obtained on the piece by virtue of the combination of the rotation of the cylindrical head and the variation of the angle between the axis of the tool and the axis of the cylindrical head in a suitable accessory.

Moreover, the machine according to the invention, as well as effecting a large number of operations on a piece, with a single placement of the piece itself, may rapidly be changed to a different type of working by virtue of the provision of both a tool magazine 34 and an accessory magazine 35 with associated tool changing and accessory changing devices which are operative automatically as required.

Again the milling-boring machine according to the invention allows easy programming of the working cycle and particularly of the various movements, including angular movements, imparted by the various numerically controlled drive means, by virtue of the fact that the cylindrical head 8 is rotatable and the two mandrels 15, 16 are symmetrically located relative to the axis of the head 8.

The machine according to the invention, moreover, lends itself to working with a reduced number of operators, who are for the most part needed only for control and supervision.

Obviously many modifications and variations may be made to the machine described above by an expert in the art in order to meet specific contingent requirements all of which modifications fall within the scope of the invention as defined by the following claims.

I claim:

1. Milling-boring machine including:

a pillar, a slide displaceable vertically along the pillar, a cylindrical horiztonal-axis head mounted in the slide so as to be rotatable about the said axis and having a fixing surface for a tool-carrying accessory, selected from a plurality of accessories, two mandrels rotatably mounted in the head with their axes parallel to and equidistant from the axis of the head, and having respective attachments for a tool selected from a plurality of tools, a magazine for said accessories, a magazine for said tools located on the opposite side of the pillar from the accessory magazine, an accessory changing device extending operatively between the cylindrical head and the accessory magazine for automatically changing the accessory on the cylindrical head, and a tool changing device extending operatively between the cylindrical head and the tool magazine for automatically changing the tools on the selected accessory or on at least one of said mandrels.

2. Milling-boring machine as defined in claim 1, and further including a single motor, two respective gear trains having different predetermined transmission ratios, and selector means for selectively coupling said motor to respective ones of said mandrels through the respective gear trains to drive a selected one of said mandrels.

* * * * *